(12) United States Patent
Evans

(10) Patent No.: US 7,676,434 B2
(45) Date of Patent: Mar. 9, 2010

(54) PAYER DIRECT HUB

(75) Inventor: Steven D. Evans, Hercules, CA (US)

(73) Assignee: Bora Payment Systems, LLC, Hercules, CA (US)

( * ) Notice: Subject to any disclaimer, the term of this patent is extended or adjusted under 35 U.S.C. 154(b) by 37 days.

(21) Appl. No.: 12/016,179

(22) Filed: Jan. 17, 2008

(65) Prior Publication Data

US 2008/0183621 A1 Jul. 31, 2008

Related U.S. Application Data

(60) Provisional application No. 60/886,945, filed on Jan. 28, 2007.

(51) Int. Cl.
*G06Q 40/00* (2006.01)
(52) U.S. Cl. ............... 705/40; 705/36; 705/38; 700/99
(58) Field of Classification Search ............ 705/40, 705/36–38, 99
See application file for complete search history.

(56) References Cited

U.S. PATENT DOCUMENTS

| | | | |
|---|---|---|---|
| 5,465,206 A | 11/1995 | Hilt et al. | |
| 5,920,847 A | 7/1999 | Kolling et al. | |
| 6,032,133 A | 2/2000 | Hilt et al. | |
| 6,070,150 A | 5/2000 | Remington | |
| 6,119,106 A | 9/2000 | Mersky et al. | |
| 6,327,577 B1 | 12/2001 | Garrison et al. | |
| 6,363,362 B1 | 3/2002 | Burfield et al. | |
| 6,408,284 B1 | 6/2002 | Hilt et al. | |
| 6,438,527 B1 | 8/2002 | Powar | |
| 6,594,647 B1 | 7/2003 | Randle et al. | |
| 6,611,818 B1 | 8/2003 | Mersky et al. | |
| 6,856,974 B1 | 2/2005 | Ganesan et al. | |
| 6,915,279 B2 * | 7/2005 | Hogan et al. ............ 705/64 |
| 6,968,319 B1 | 11/2005 | Remington et al. | |
| 7,028,008 B2 | 4/2006 | Powar | |

(Continued)

FOREIGN PATENT DOCUMENTS

WO 02/11089 A1 2/2002

(Continued)

OTHER PUBLICATIONS

B2B electronic payment solution of fast moving consumer goods industry. Weijun Wang; Rui Xiong; Jing Sun, 2007 3rd International Conference on Wireless Communications, Networking, and Mobile Computing—WiCOM '07. IEEE, Piscataway, NJ, "Abstract", Sep. 2007.*

(Continued)

*Primary Examiner*—Hani Kazimi
*Assistant Examiner*—Clifford Madamba
(74) *Attorney, Agent, or Firm*—Vierra Magen Marcus & DeNiro LLP

(57) ABSTRACT

A system and methods for processing payment requests submitted by a payer through a single user interface. The system obtains a merchant identification and a processing platform associated with each payee. The system receives at least one payment request from the payer. Payment instructions are generated based on each payment request received from the payer. The system routes each of the payment instructions to an acquirer processor for authorization to be processed as a credit card transaction.

22 Claims, 10 Drawing Sheets

U.S. PATENT DOCUMENTS

| | | | |
|---|---|---|---|
| 7,058,611 | B2 | 6/2006 | Kranzley et al. |
| 7,085,997 | B1 | 8/2006 | Wu et al. |
| 7,143,069 | B2 * | 11/2006 | Lacivita et al. ................ 705/64 |
| 7,177,848 | B2 | 2/2007 | Hogan et al. |
| 7,206,768 | B1 | 4/2007 | deGroeve et al. |
| 7,236,950 | B2 | 6/2007 | Savage et al. |
| 7,240,031 | B1 | 7/2007 | Kight et al. |
| 7,251,656 | B2 | 7/2007 | Keown et al. |
| 2002/0069167 | A1 | 6/2002 | Conlow |
| 2003/0191711 | A1 | 10/2003 | Jamison et al. |
| 2004/0029569 | A1 | 2/2004 | Khan et al. |
| 2004/0044621 | A1 | 3/2004 | Huang et al. |
| 2004/0064407 | A1 | 4/2004 | Kight et al. |
| 2004/0158522 | A1 | 8/2004 | Brown et al. |
| 2004/0215560 | A1 * | 10/2004 | Amalraj et al. ............... 705/40 |
| 2004/0225609 | A1 | 11/2004 | Greene |
| 2004/0236677 | A1 * | 11/2004 | Tyson-Quah ................ 705/38 |
| 2005/0060261 | A1 | 3/2005 | Remington et al. |
| 2005/0065882 | A1 | 3/2005 | Remington et al. |
| 2005/0102231 | A1 | 5/2005 | Remington et al. |
| 2005/0131816 | A1 | 6/2005 | Britto et al. |
| 2005/0137978 | A1 | 6/2005 | Ganesan et al. |
| 2005/0165680 | A1 | 7/2005 | Keeling et al. |
| 2005/0177505 | A1 | 8/2005 | Keeling et al. |
| 2005/0234820 | A1 | 10/2005 | MacKouse |
| 2006/0020542 | A1 | 1/2006 | Litle et al. |
| 2006/0064377 | A1 | 3/2006 | Ganesan et al. |
| 2006/0080240 | A1 | 4/2006 | Mersky |
| 2006/0149671 | A1 | 7/2006 | Nix et al. |
| 2006/0184451 | A1 | 8/2006 | Ganesan et al. |
| 2006/0195395 | A1 | 8/2006 | Ganesan et al. |
| 2006/0195396 | A1 | 8/2006 | Ganesan et al. |
| 2006/0206425 | A1 | 9/2006 | Sharma |
| 2006/0212393 | A1 | 9/2006 | Brown |
| 2006/0229985 | A1 | 10/2006 | Lalwani et al. |
| 2007/0130347 | A1 | 6/2007 | Rangan et al. |
| 2007/0150414 | A1 | 6/2007 | Templeton |

FOREIGN PATENT DOCUMENTS

| | | |
|---|---|---|
| WO | 02/075499 A2 | 9/2002 |
| WO | 00/33221 A1 | 6/2008 |

OTHER PUBLICATIONS

The Joy of Advance Notification of Payment. Cafiero, W.G., EDI Forum, vol. 5, No. 3, "Abstract", 1992.*

Electronic Commerce in Cash Management and Banking-Traditional Product Offerings and Emerging Trends. Provencher, T., CMA, vol. 68, No. 5, "Abstract", Jun. 1994.*

Notification of Transmittal of the International Search Report and The Written Opinion, dated Jul. 23, 2008, for International Application No. PCT/US2008/051923, filed Jan. 24, 2008.

Notification of Transmittal of the International Search Report and The Written Opinion, dated Jul. 23, 2008, for International Application No. PCT/US2008/051923, filed Jan. 24, 2008.

Notification Concerning Transmittal of International Preliminary Report on Patentability and Written Opinion, dated Jul. 28, 2009, International Application No. PCT/US2008/051923, filed Jan. 24, 2008.

* cited by examiner

FIG. 2

| Payment Center | Payees | Reports | Account Services | About PDH |
|---|---|---|---|---|
| Make Payments | Pending Payments [3] | Prior Payments | Declined Payments [2] | |

Pending Payments 300

You may cancel or modify scheduled payments if the Submission date is at least one day in the future. [?] Help ⊙ Warning - A decline was encountered for Visa 1111. You must either resubmit or delete the declined payments for this payment account before scheduled payments using the same payment account can be processed. Download Pending Payments

Pending

Payees: [All ▼] [Go]

| Payee △ | Payment Account | Status | Submit On | Amount | |
|---|---|---|---|---|---|
| AT&T — 316 | 370 — ⊙ Visa 1111 — 328 | Prior Payments 09/04/2007 Scheduled | 11/04/2007 | $123.00 | |
| P.O. Number 338 — AT-95290 | Invoice Number 340 — 30380 | Reference Number 342 — 30452 — 318 320 | | 322 310 324 312 | |
| Payee | Payment Account | Status | Submit On | Amount | |
| AT&T | 370 — ⊙ Visa 1111 — 328 | Prior Payments 09/04/2007 Scheduled | 11/16/2007 | $191.32 | [Edit] [Delete] |
| P.O. Number | Invoice Number | Reference Number | | 344 346 | |
| Payee | Payment Account | Status | Submit On | Amount | |
| Office Depot | 350 — MasterCard 4444 | Prior Payments 10/08/2007 Scheduled | 11/14/2007 | $543.19 | [Edit] [Delete] |
| P.O. Number 358 — PO-3473945 | Invoice Number 124992 | Reference Number 30425 | | | |

[Edit] [Delete]

304, 314, 326, 336, 348, 358, 360, 362, 364, 366, 368

Pending Payments [?] Help

If a payment has already been submitted, it may not be edited or cancelled. A status of 'Authorized' indicates the payment is processing. Your issuing bank will set aside each authorized amount and decrease your available balance as each payment is authorized. The actual settlement will not show for up to 24 hours or more. — 356

FIG. 3

| Payment Center | Payees | Reports | Account Services | About PDH |
|---|---|---|---|---|
| Make Payments | Pending Payments [3] | Prior Payments | Declined Payments [2] | |

Declined Payments 400      [?] Help

To view all declined payments, select "All" in the payee drop down box.    402    Download Declined Payments

| Declined | | | | | | | |
|---|---|---|---|---|---|---|---|
| Payees | 407 — 405 Disposition Date 409 | | | | | | |
| All ▼ | From: 10/05/2007 📅 To: 11/04/2007 📅 Go | | | | | | |

| Payee △ | Payment Account | P.O. Number | Invoice Number | Reference Number | Submit On | Disposition Date | Pending Payments | Resubmit Date | Amount | |
|---|---|---|---|---|---|---|---|---|---|---|
| AT&T | 406 — Visa 1111 | 408 | | 418 — AT-67623 | 420 — 30362 | 10/04/2007 | 422 — 11/04/2007 | 410 — 10/05/2007 | 414 / 424 426 — $129.37 | [Resubmit] [Delete] |

| Payee | Payment Account | P.O. Number | Invoice Number | Reference Number | Submit On | Disposition Date | Pending Payments | Resubmit Date | Amount | |
|---|---|---|---|---|---|---|---|---|---|---|
| Comcast | 430 — Visa 1111 | | CM-98734535 | 432 — 30398 | 10/21/2007 | 434 — 10/22/2007 | No | 446 | 438 — $265.15 | [Resubmit] 448 [Delete] 450 |

Declined Payments [?] Help

Declined payments may be edited and then resubmitted. Under Payment Preferences in the User Profile Screen you may set preferences that resubmit payments automatically after the statement ending date and suspend all pending payments for a card that has been declined.

FIG. 4

| Reason Groups | Reason Codes | Reply Values |
|---|---|---|
| Decline Codes 710 | 202 (expired), 210 (credit limit), 233 (general processor), 200 (AVS), 201 (issuer decline), 203 (general), 204 (insufficient funds), 205 (stolen / lost), 208 (inactive card), 211 (AVS related), 221 (suspicious card), 230 (AVS related) | 0 |
| Failure Codes 712 | | |
| Invalid Data 714 | 101, 102, 231, 244, 232 (card not accepted), 240 (card type) | -1 |
| Recoverable System Failures 716 | 150, 151, 152, 236, 239 (N/A), 241 (N/A), 250 (timeout), 207 (processor unavailable) | -1 |
| Unrecoverable Failure 718 | 234 (merchant config), 254, 255, 600 | -1 |
| Successful Authorizations | 100 | 1 |

Fig. 7

PAYER DIRECT HUB

CLAIM OF PRIORITY

This application claims the benefit under 35 U.S.C. §119 of U.S. Provisional Application No. 60/886,945, which was filed with the United States Patent & Trademark Office on Jan. 28, 2007.

BACKGROUND

There are typically two variations how a Payer (e.g., individual or company) makes a credit card payment to pay an invoice from a supplier or merchant (Payee). The Payer may call the merchant and give the remittance information along with the credit card number over the phone. Or the Payer logs in to the merchant's web-site and use the merchant's web-based credit card payment interface to make the payment. Both are very time consuming and cumbersome tasks. Furthermore, the current process does not allow for consolidated updates of the Payer's accounts payable (AP) system. The Payer must wait several days or even weeks to receive a settlement file from their issuing bank, which is difficult to upload to the AP system owing to non-matching Payee reference identifications (IDs) between the AP system and the interchange (e.g., Visa or MasterCard Merchant ID).

There is growing motivation for Payers to use credit cards over the traditional electronic payment methods, which include converting the electronic payment request to a physical check, using an Automated Clearing House (ACH), wire, and other electronic payments. However, current credit card products and payment methods currently used in the market are not conducive for easily facilitating this form of payment and are impeding the growth of the AP market for this payment type.

SUMMARY

One aspect of the present technology is to provide a system for processing payment requests submitted by a payer through a single user interface. In one embodiment, the system obtains a merchant identification and an acquirer processor identification associated with each Payee. The system receives payment requests from the Payer. In one embodiment, each payment request designates the payee, credit card information, a date to charge the credit card, and an amount to charge the credit card. The system generates payment instructions based on each payment request received from the payer, and subsequently routes the payment instructions to an Acquirer Processor or Acquirer Gateway to allow the payment instructions to be processed as a single credit card transaction.

One aspect of the present technology is to provide a system for managing authorization of credit card payments. The system receives payment requests from the Payer. The system generates payment instructions based on each of the payment requests received from the Payer. In one embodiment, the system, before routing the payment instructions to the Acquirer Processor (or Acquirer Gateway), identifies other payment instructions with the same credit card number having the same charge date but for a smaller charge amount. If none of the other payment instructions with the same credit card number for the same charge date are for a smaller charge amount, the system proceeds to submit the payment instructions to an Acquirer Processor (or Acquirer Gateway) to be processed as a credit card transaction. However, if there are other payment instructions with the same credit card for the same charge date for a smaller charge amount, the system suspends submission of the payment instructions until the Acquirer Processor (or Acquirer Gateway) receives a final authorization associated with each of the other payment instructions for smaller charge amounts.

One aspect of the present technology is to provide a system for managing authorization of credit card payments scheduled by a Payer. The system generates payment instructions based on each payment request received by the Payer, and stores the payment instructions in a pending payments queue. The system submits the payment instructions stored in the pending payments queue to an Acquirer Processor (or Acquirer Gateway) to process the payment instructions as a credit card transaction. Upon receiving an unsuccessful authorization notification from the acquirer processor (or Acquirer Gateway), the system interrogates whether the unsuccessful authorization notification is associated with a decline value or a failure value. In one embodiment, if the unsuccessful authorization notification is associated with a decline value, the system suspends all payment instructions stored in the pending payments queue with the same credit card number as the denied payment instructions. In another embodiment, if the unsuccessful authorization notification is associated with a recoverable failure value, the system resubmits the denied payment instructions to the Acquirer Processor (or Acquirer Gateway) for authorization. In yet another embodiment, if the unsuccessful authorization notification is associated with an unrecoverable failure value, the system suspends all payment instructions stored in the pending payments queue with the same credit card as the denied payment instructions.

One aspect of the present technology is to provide one or more processor readable storage devices having processor readable code embodied on the processor readable storage devices, wherein the processor readable code is for programming the one or more processors to perform a method for managing multiple credit card payments. In one embodiment, the one or more devices includes an interface engine, an application engine and a database engine. In one embodiment, the interface engine is configured to allow a Payer to schedule payment requests to one or more Payees. In one embodiment, each payment request designates a Payee, a credit card, a charge date and a charge amount. The application engine is configured to generate payment instructions based on each of the payment requests received from the payer, route each of the payment instructions to the acquirer processor (or Acquirer Gateway) designated in the payment instructions, and receive an authorization notification from the acquirer processor (or Acquirer Gateway). The database engine is configured to store each of the payment instructions.

BRIEF DESCRIPTION OF THE DRAWINGS

FIG. 2 depicts an exemplary user interface for making payments;

FIG. 3 depicts an exemplary user interface for viewing pending payments;

FIG. 4 depicts an exemplary user interface for viewing declined payments;

FIG. 7 depicts an exemplary logic table interrogated by the Payer Direct Hub;

DETAILED DESCRIPTION

Figure 1:
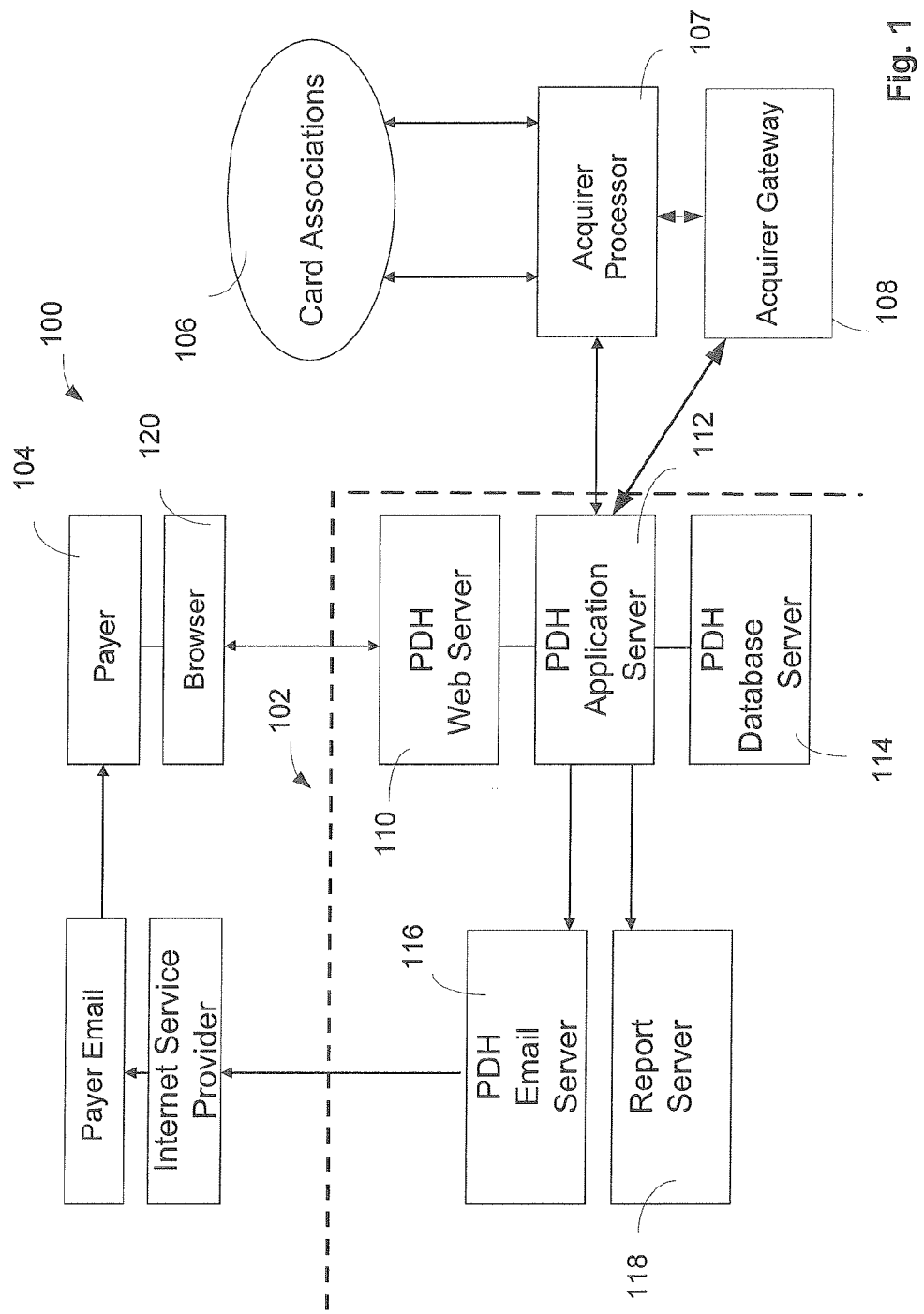
FIG. 1 depicts a block diagram illustrating one embodiment of a Payer Direct Hub.

FIG. 1 illustrates a credit card payment system 100. The system 100 generally includes a Payer Direct Hub (PDH) 102, an Acquirer Processor 107, an Acquirer Gateway 108 and a Card Association network 106. As will be discussed in more detail later, the PDH 102 facilitates a new method for processing credit card payments between the Payer 104 and multiple Payees. The PDH 102 allows the Payer 104 to schedule multiple credit card payments to multiple Payees for monies owed by the Payer through a single user interface.

The PDH 102 in FIG. 1 communicates with either the Acquirer Processor 107 or the Acquirer Gateway 108. As used herein, an Acquirer refers to the acquiring bank in a credit card transaction. The acquiring bank is the Payee's merchant bank and typically has the liability associated with the merchant's (Payee) behavior in a transaction. Often the acquiring bank has a service contract with a service company to perform the acquiring function of routing credit card authorizations, settlements, and chargebacks for the acquiring bank on behalf of the Payee. This service company is referred to herein as the Acquirer Processor 107. The Acquirer Processor 107 shown in FIG. 1 is an intermediary or service bureau that provides a single point of access to various payment networks. For example, the Acquirer Processor 107 may provide access to card interchanges such as Visa, MasterCard, Discover, American Express, Diner's Card, and the like. The Acquirer Gateway 108 is an intermediary or service bureau that provides a single point of access to various Acquirer Processors 107. A few of the prominent vendors in this market include Cybersource, Pay-Me-Now and Authorize.net.

One embodiment of the PDH 102 is shown in FIG. 1. In this embodiment, the PDH 102 comprises a web server 110, an application server 112, a database server 114, an email server 116 and a report server 118. Each of these servers includes one or more processors in communication with memory, non-volatile storage and one or more communication interfaces (e.g., network interface, wireless interface, etc.).

FIG. 1 illustrates that the Payer 104 accesses the PDH web server 110 through a browser 120. The web server 110, among other things, facilitates communication (e.g., SSL, HTTPS) between a Payer/Payee and their browsers and the application server 112 and provides the user interfaces (described below) that enables Payer and Payees to communicate with the PDH 102 via a standard web browser.

The application server 112 performs many functions. By way of example only, the application server 112 provides data to the web server 110 for presentation to the Payers, adds data to, updates, and retrieves data from the database server 114, enforces the PDH business logic, communicates with an Acquirer Processor or Acquirer Gateway web servers via a secure channel (e.g., SSL/HTTPS) for the authorization and settlement of payment instructions, and provides email requests to the email server 116 for the broadcasting of email alerts to Payers.

The database server 114 may, among other things, store Payer and Payee user information, credit card information (e.g., credit card number, statement end date, etc.), and information related to the payment instructions, responds to data updates and data retrieval from the application server 112 and delivers data to report server 118 when requested. The email server 116 manages the transmission of email notifications generated by the Application Server 112 and sent to the Payer. The report server 118 generates reports that can be accessed by either a Payer or a Payee (described in more detail later).

Suppose the Payer is an employee of Company A and Company A issued the Payer a company commercial credit card. In one embodiment, the Payer 104 registers with the PDH 102 and obtains a unique Payer ID (company ID), a login ID (individual ID) and a password. To insure a second level of security, the Payer may install a digital certificate obtained from the PDH 102. The PDH 102 may also collect from the Payer 104 company and individual data such as a physical address and email address.

The Payer, after registering, may register a Payee by creating a Payee profile that includes, among other things, the Payee's Merchant ID (MID) and processing platform name. The Payee's processing platform may comprise either an Acquirer Processor 107 or an Acquirer Gateway 108. When a Payer adds sufficient information on a Payee (Merchant ID, processing platform, Payee address, etc.) necessary to route payment instructions to the Payee, the Payee should be considered registered in the PDH 102 but not enrolled. A Payee is enrolled when at least one person (e.g., employee of Payee) is approved for the purposes of logging into the PDH 102 and accessing screens. In one embodiment, the Payee is assigned a Payee ID. Using the Payee ID, the Payee may access the PDH 102 and view only the reports and queues that the Payer has authorized the Payee to view (e.g., pending payments queues described in more detail later).

Figure 2:
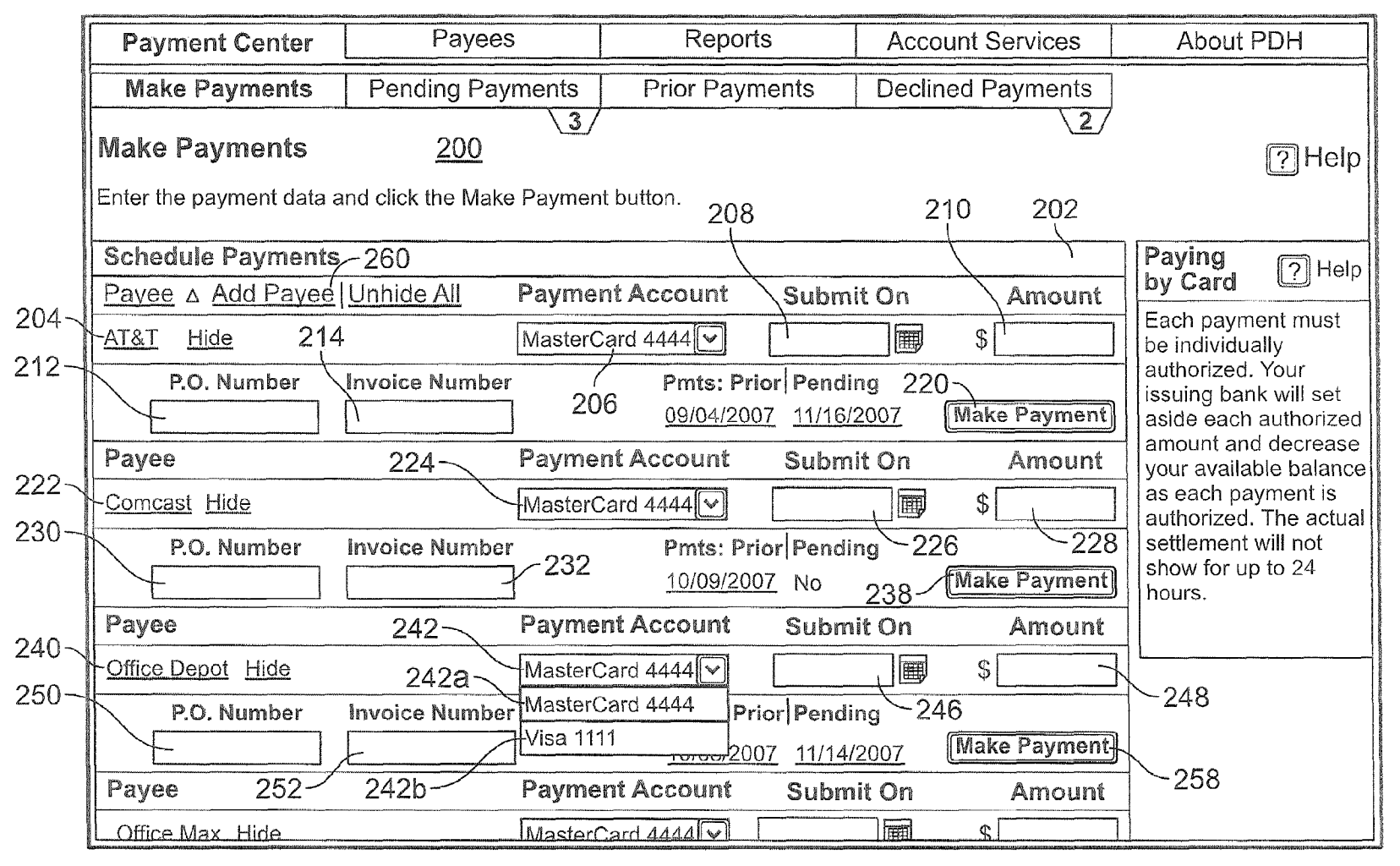

FIG. 2 illustrates an exemplary Make Payments user interface 200 that may be provided by the PDH 102 in order to allow the Payer to schedule payments to one or more Payees. The scheduled payments are for monies owed by the company that will be paid for by the employee on his issued commercial credit card. The Make Payments user interface 200 includes a screen 202 that allows the Payer 104 to schedule a credit card payment to one or more Payees. The Payer 104 schedules each payment request by designating, by way of example only, a payment account (commercial credit card to charge), a submit date (the date to charge the commercial credit card), a charge amount (the amount to charge the commercial credit card), a purchase order number, and an invoice number. For example, in FIG. 2, a Payer 104 is scheduling a payment request to pay for monies owed to three Payees: AT&T 204, Comcast 222 and Office Depot 240.

The Payer 104 schedules a payment request to AT&T 204 by entering in the payment data in screen 202. For example, the Payer 104 has selected to charge the money owed to AT&T 204 to the credit card designated as "MasterCard 4444" 206 in the drop-down menu. The credit card numbers available in the drop-down menu represents the commercial credit cards that the Payer is authorized to use. At a minimum, the Payer 104 also enters a date to charge "MasterCard 4444" in the Submit On window 208 and the amount to charge "MasterCard 4444" in the Amount window 210. If that is all the information the Payer 104 intends to include in the payment request to AT&T 204, the Payer may select the Make Payment button 220.

To aid in tracking the payment to AT&T 204, the Payer 104 may also enter a purchase order number in the P.O. Number window 212 and enter an invoice number in the Invoice Number window 214 before selecting the Make Payment button 220. This information is not required.

The Payer 104 may also schedule payment requests to Comcast 222 and Office Depot 240 before selecting a Make Payment button. To schedule a payment request to Comcast 222, the Payer 104 designates the payment account 224, the Submit On date 226 and the charge amount 228. The Payer 104 may also want to add a purchase order number in the P.O. Number window 230 and an invoice number in the Invoice Number window 232 for tracking purposes. After the payment request to Comcast 222 has been entered, the Payer 104 may select the Make Payment button 238.

To schedule a payment request to Office Depot 240, the Payer designates the Payment Account 242, the Submit On date 246 and the Amount 248. The Payment Account window 242 is shown as a drop-down menu containing two accounts: "MasterCard 4444" and "Visa 1111." Such a drop-down menu limits the account choices provided to the Payer and prevents having to enter the entire account number every time a payment request is scheduled. To assist in tracking the payment to Office Depot 240, the Payer 104 may also enter the purchase order number in the P.O. Number window 250 and an invoice number in the Invoice Number window 252. After the payment information to Office Depot 240 has been entered, the Payer 104 may select the Make Payment button 258.

Upon selecting a Make Payment button, the PDH 102 generates payment instructions based on the payment data entered for the specific Payee. For example, the PDH 102 generates payment instructions based on the payment data to AT&T 204 when the Payer 104 selects the Make Payment button 220. The PDH 102 generates payment instructions based on the payment data to Comcast 222 when the Payer 104 selects the Make Payment button 238, and so on. Each of the payment instructions comprise a set of data required to process the payment to a Payee as a single credit card transaction. In the FIG. 2 embodiment, the PDH 102 will generate three separate payment instructions: payment instructions for AT&T 204, payment instructions for Comcast 222 and payment instructions for Office Depot 240. The PDH 102 stores each of the payment instructions in a pending payment queue (to be discussed in more detail hereinafter).

The PDH 102 allows the Payer to view pending payment requests. FIG. 3 illustrates an exemplary embodiment of a Pending Payments user interface 300. The Pending Payments user interface 300 displays each of the pending payments requests that have been scheduled by the Payer 104. The Payer 104 may control which pending payment requests to view. FIG. 3 illustrates a screen 302 whereby the Payer 104 chose to display pending payment requests for all payees.

The screen 302 shown in FIG. 3 illustrates three pending payment requests. One pending payment request is scheduled to AT&T 304. A second pending payment request is scheduled to AT&T 326. A third pending payment request is scheduled to Office Depot 348. The screen 302 displays the payment account, the status of the payment request, the Submit On date (also referred to herein as a "charge date") and the amount associated with each pending payment. The Payer 104 may also view, if they entered it in the Make Payments screen 202, a P.O. Number and an invoice number associated with each scheduled payment request.

The first pending payment request shown in FIG. 3 is scheduled to AT&T 304 for an amount 312 of $123.00. The screen 302 displays that the charge amount ($123.00) is scheduled to be charged to the credit card number 306 designated as "Visa 1111" on Nov. 4, 2007. The second pending payment request is scheduled to AT&T 326 for the amount of $191.32. The screen 302 displays that the charge amount ($191.32) is scheduled to be charged to the credit card number designated as "Visa 1111" on Nov. 16, 2007. The third pending payment request is scheduled to Office Depot 348 for the amount 356 of $543.19. The screen 302 displays that the charge amount ($543.19) is scheduled to be charged to the credit card number designated as "MasterCard 4444" on Nov. 14, 2007.

To help track the payment scheduled to AT&T 326, the Payer previously entered an invoice number 338 ("AT-95290") and reference number 340 (30380) associated with the payment to AT&T 326. To help track the payment scheduled to Office Depot 348, the Payer previously entered a P.O. Number 358 ("PO-3473945"), an invoice number 360 ("124992") and a reference number 362 (30425) associated with the payment to Office Depot 348.

Each scheduled payment includes a reference number. The payment scheduled to AT&T 304 is associated with reference number 318 (30452). The payment scheduled to AT&T 326 is associated with reference number 340 (30380). The payment scheduled to Office Depot 358 is associated with reference number 362 (30425). In one embodiment, each reference number is a unique identification generated by the PDH 102. In an alternative embodiment, each reference number is a unique disbursement identification that is input by the Payer (e.g., unique number associated with Company's internal AP system). In another embodiment, the reference number is a unique number issued by the card association (e.g., transaction reference number). Of course, each payment request may be associated with more than one reference number and may be associated with any combination of reference numbers.

FIG. 3 also illustrates that the Pending Payments user interface 300 provides the Payer 104 with the option to edit any of the pending payments shown in the pending payments screen 302. For example, the Payer 104 may edit the payment to AT&T 304 by selecting the edit button 322. By selecting the edit button 322, the Payer is provided the opportunity to change the Payment Account 306, Submit On date 310, Amount 312, P.O. Number 314 and Invoice Number 316 associated with the payment to AT&T 304. Upon changing any of the information associated with the payment to AT&T 304, the Payer may save the changes. Once saved, the pending payment to AT&T 304 will reappear on the pending payments screen 300 reflecting the changes. Alternatively, the Payer may choose to delete the pending payment to AT&T 304 by selecting the delete button 324.

The Payer may edit the payments pending to AT&T 326 and Office Depot 348 in a similar fashion. The Payer may edit the payment to AT&T 326 by selecting the Edit button 344 and may delete the payment by selecting the Delete button 346. The Payer may edit the payment to Office Depot 348 by selecting the Edit button 366 and may delete the payment by selecting the Delete button 368.

FIG. 3 illustrates that the Pending Payments user interface 300 also provides the Payer with a warning 370 that a prior scheduled payment associated with the same credit card number has been declined. For example, the pending screen 302 displays a warning 370 (e.g., exclamation point graphic) associated with the payment account 306 "Visa 1111" for the pending AT&T 206 payment. The Pending Payments screen 302 also displays the same warning 370 associated with the payment account 328 designated as "Visa 1111" for the pending AT&T 326 payment.

FIG. 4 illustrates an exemplary Declined Payments user interface 400. In this embodiment, the Declined Payments user interface 400 includes a screen 402 that displays all declined payments and provides the Payer the opportunity to either resubmit or delete the declined payment. The Payer may select a disposition date range to limit the display of declined payments. Here, the Payer has chosen to display all declined payments between Oct. 5, 2007 (407) and Nov. 4, 2007 (409). Within this date range, the screen 402 displays two declined payments.

The first declined payment was a payment request to AT&T 404. For the declined payment to AT&T 404, the screen 402 displays the payment account 406 ("Visa 1111"), the Submit On date 408 (Oct. 4, 2007), the disposition date (Oct. 5, 2007) and the amount 414 ($129.37). The Submit On date 408 refers to the date the payment instructions to AT&T 404 were routed to the Acquirer Gateway 108 (or directly to an Acquirer Processor). The disposition date 410 refers to the date the payment instructions to AT&T 404 were declined. The screen 402 also displays any additional information that the Payer entered in the Make Payments interface 200. For example, with respect to the payment to AT&T 404, the screen 402 displays the invoice number 418 (AT-67623). The payment scheduled to AT&T 402 also includes a Reference Number 420 (30362).

The screen 402 also displays a declined payment to Comcast 428. For the payment request to Comcast 428, the screen 402 displays the payment account 430 (Visa 1111), the Submit On date 432 (Oct. 21, 2007), the disposition date (Oct. 22, 2007) and the amount 438 ($265.15). The screen 402 also displays any additional information that the Payer entered in the Make Payments interface 200. For example, with respect to the payment to Comcast 428, the screen 402 displays the invoice number 442 (CM-98734535). The payment to Comcast 428 also includes a Reference Number 444 (30398).

The Declined Payment user interface 400 provides the Payer the opportunity to manually resubmit or delete the declined payment instructions. For example, the Payer may resubmit the declined payment instructions to AT&T 404 by selecting the Resubmit button 424. The Payer may delete the declined payment instructions to AT&T 404 by selecting the Delete button 426. Similarly, the Payer may resubmit the declined payment instructions to Comcast 428 by selecting the Resubmit button 448. The Payer may delete the declined payment instructions to Comcast 428 by selecting the Delete button 450.

Figure 5:
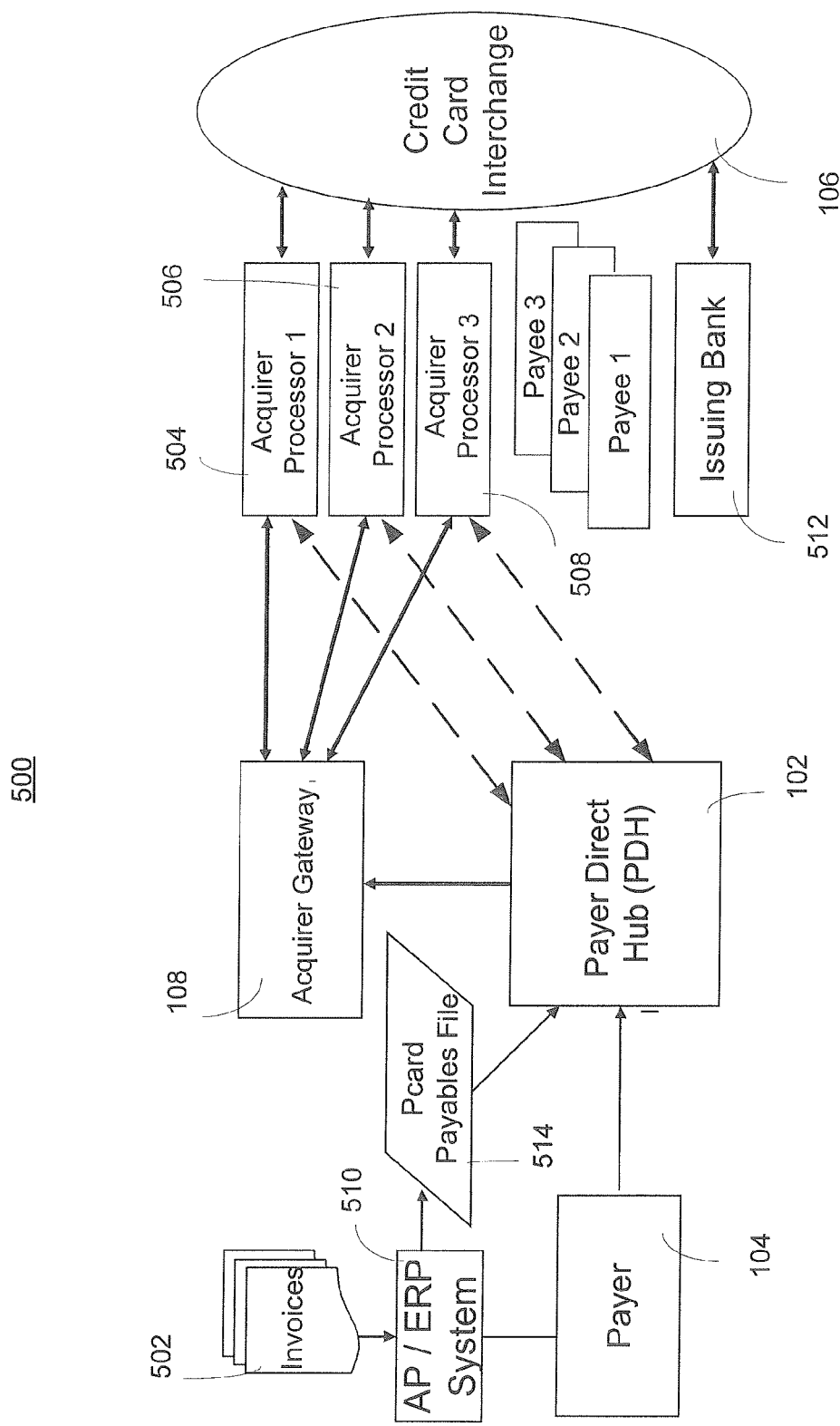
FIG. 5 depicts a block diagram illustrating an exemplary invoice payment component of the Payer Direct Hub shown in FIG. 1.

FIG. 5 illustrates a schematic diagram displaying one embodiment of the PDH 102 within a credit card processing system 500. For discussion purposes only, previously described elements will be labeled with the same reference numbers. The participants in the processing system 500 includes the PDH 102, the Payer 104, an AP system 510, an Acquirer Gateway 108, Acquirer Processors 504-508, a credit card interchange 106 and an issuing bank 512.

Suppose, for example, that the Payer 104 is an employee of Company A, and Company A has issued the Payer a commercial credit card. In this example, suppose the Payer has purchased office supplies from Office Depot for Company A and Company A pays for a cellular phone it issued to the Payer. Depending on the arrangement between the Payer and Company A, the Payer or Company A (e.g., through its Accounts Payable department) may receive invoices 502 from Office Depot and AT&T. Thus, the term "Payer," as used herein, may comprise the employee or Company A (e.g., Company A's accounts payable personnel, etc.). If it is the Payer's responsibility to schedule payments, the Payer 104 logs into the PDH 102 and schedules payment requests to Office Depot and AT&T in the Make Payments interface 200 as previously described above. Unlike a conventional credit card business model where the Payer would have to log onto the Office Depot website and the AT&T website individually and enter credit card information, a Payer, using the PDH 102, only logs onto a single website or user interface to schedule both of these payments.

The invoices 502 from each merchant (e.g., Office Depot and AT&T) may alternately be sent electronically (or otherwise) to Company A's Accounts Payable (AP) system 510. Company A's AP department 510 may receive invoices associated with purchases by Company A employees that have been issued a commercial card. The AP department 510 may enter or upload payment requests for monies owed by the Company to each merchant, creating a single payables file 514. The payables file 514 may then be sent electronically to the PDH 102. For example, suppose that Company A has fifteen employees (each referred to as a Payer). The AP system 510 may schedule payment requests (electronically or entered manually) for monies owed by Company A to merchants for charges accrued by its fifteen employees and save all of the payment requests in a single payables file 514. In one embodiment, the payables file 514 includes the same data as the Make Payments interface 200. Sending a single payables file 514 electronically to the PDH 102 saves time and eliminates the need for each individual Payer to manually schedule payment requests.

The PDH 102 will manage processing of all payment requests either entered manually through the Make Payments interface 200 or uploaded via a payables file 514. Unlike a conventional bill pay system where the payment request would be converted to a Direct Deposit Account (DDA) transfer, a check, and so on, to pay for monies owed, the PDH 102 will transact each of the scheduled payment requests as a credit card transaction.

FIG. 5 illustrates that the PDH 102, in one embodiment, passes the payment instructions to the Acquirer Gateway 108 (via link 516). As described above, the payment instructions contain information designating the specific Acquirer Processor. The Acquirer Gateway 108 then passes the payment instructions to the designated Acquirer Processor. FIG. 5 illustrates that Acquirer Gateway 108 communicates with three Acquirer Processors: Acquirer Processor 1 504, Acquirer Processor 2 506 and Acquirer Processor 3 508. The technology described herein is not limited to any specific number of Acquirer Gateways or Processors.

In an alternative embodiment, the PDH 102 communicates directly with each of the Acquirer Processors (shown in FIG. 5 by dashed lines). Thus, the Acquirer Gateway 108 is not required in the system 500. For example, the PDH 102 may communicate directly with each Acquirer Processor designated in the payment instructions. FIG. 5 illustrates that the PDH 102 may communicate directly with either Acquirer Processor 504, Acquirer Processor 506 or Acquirer Processor 508. In one embodiment, the PDH 102 passes the payment instructions to the Acquirer Processor or Acquirer Gateway 108 via HTTPS. The PDH 102 may, however, communicate with each Acquirer Processor or Acquirer Gateway 108 via any communication standard. For purpose only of describing the technology herein, the card transaction process will be described through a system using an Acquirer Gateway. However, as discussed above, the processing system is not required to include an Acquirer Gateway.

After login and authorization of the digital certificate (if one was issued), the PDH presents an electronic credit card payment form that preferably in a format recognized by the Acquirer Gateway 108 (or Acquirer Processor). The Payer may designate the Payee in each payment request in many ways. For example, the Payer may designate the Payee by a Payee identification, merchant identification (ID), company name and/or contact person. If the Payee's merchant ID is not known by the Payer, the PDH locates the Payee's merchant ID based on the Payee ID and includes the Payee's merchant identification in the payment instructions that are routed to the Acquirer Gateway.

The PDH queues multiple payment instructions with the same credit card number and waits for a final authorization from the issuer processor (entity that authorizes and settles payments on behalf of the issuing bank) before another payment instruction in the queue is submitted. Consequently, the PDH 102 queues the payment instructions and awaits a response from the Acquirer Gateway 108 in order to prevent unnecessary submissions to the interchange on subsequent payments that are very likely all to be declined. This prevents unnecessary fees being charged by all processors in the interchange chain, which depending on the contractual relationships, would likely be charged to either the issuing bank or the merchant. In addition, the PDH is saving the Payer from a lot of unnecessary work to deal with all the payments that would have been declined that should not have been submitted. The payer can view the progression of the authorization queue at the PDH after submitting the payment request.

Figure 6:
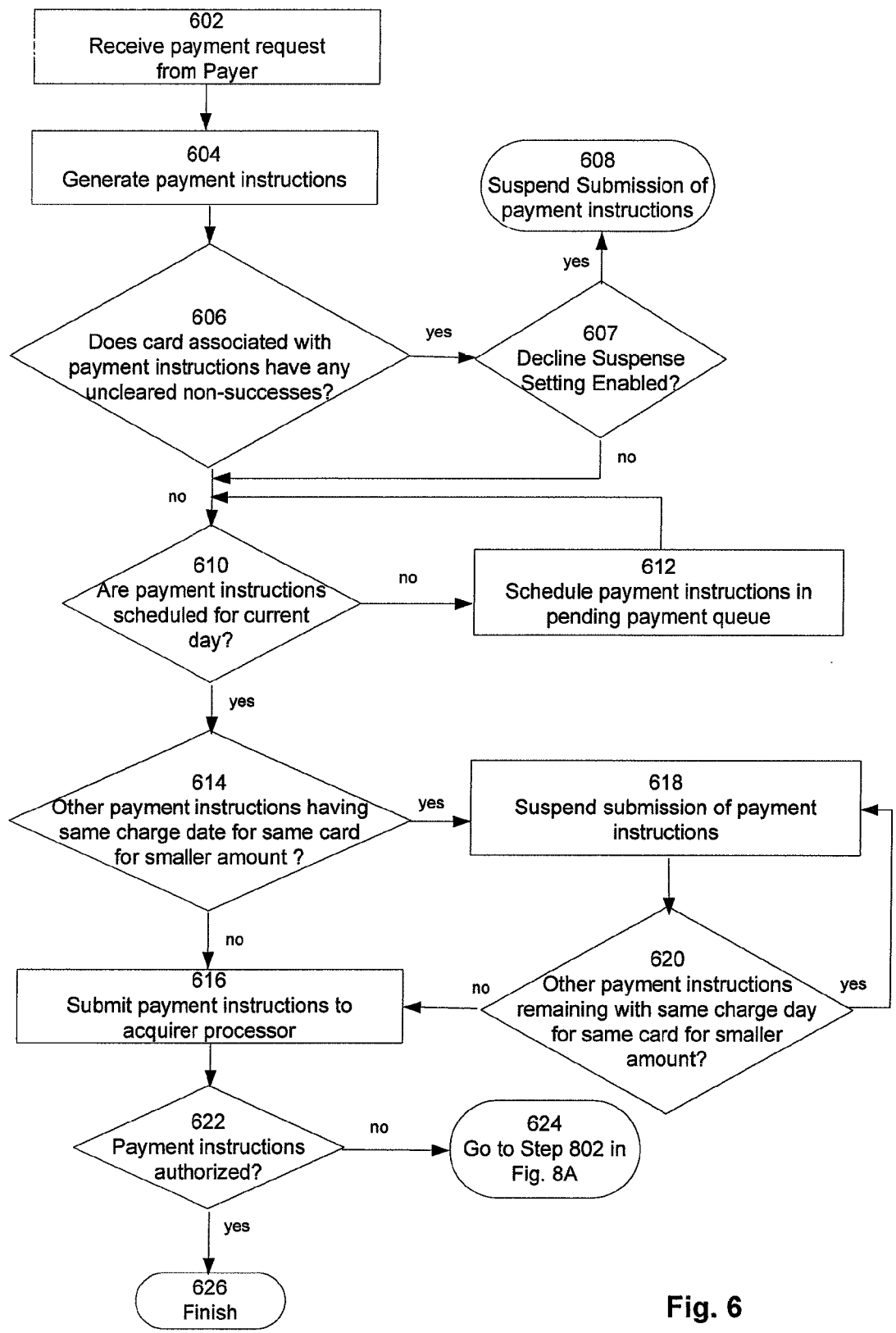
FIG. 6 depicts a flow diagram displaying exemplary steps of a payment methodology of the Payer Direct Hub shown in FIG. 1.

FIG. 6 illustrates a flow diagram providing exemplary steps describing one embodiment of credit card processing. In step 602, the PDH 102 receives a new payment request from the Payer 104. As discussed above, the Payer 104, in the Make Payment user interface 200, has entered the charge amount, the charge date and has designated the credit card to charge the payment against. The Payer 104 must also designate the Payee. In one embodiment, the Payer 104 designates the Payee by the Payee's unique Payee identification. In an alternative embodiment, the Payer designates the Payee from a pre-set Payee list. For example, as shown in FIG. 3, the Payer 104 has selected to schedule a payment request to AT&T 304. In this payment request, the Payer has chosen to pay for monies owed to AT&T 304 by charging the payment account 306, "Visa 1111," and designated a charge date 310 of Nov. 2, 2007 to charge $123.00. The Payer scheduled this payment request to AT&T 304 in the Make Payments interface 200 (or uploaded it) and then selected the Make Payment button.

In one embodiment, once a Payee is registered with the PDH, the Payee is available to all Payers within the Payer company. For example, if Company A registers AT&T 304 with the PDH 102, AT&T 304 is available to all of Company A's employees. In another embodiment, once a Payee is registered, there will be a company payee list as well as an individual payer list. For example, each Company A employee could access a Payee list that consists of the Payees the employee personally registered, and other Payees registered by fellow employees (if they pay the same vendor). That is, each Payee list will be customized according to the Payees that each Payer pays on a recurring basis.

Upon receipt of the new payment request from the Payer, the PDH 102 generates payment instructions based on the individual payment request, in step 604. For example, the PDH 102 generates payment instructions for the payment request to AT&T 304. The PDH 102 retrieves the credit card information associated with the payment account 306 (Visa 1111), the charge date 310 (Nov. 4, 2007) and the charge amount 312 ($123.00) entered by the Payer. The PDH bundles the merchant identification (ID) and acquirer processor identification associated with the Payee with the retrieved information. Thus, the payment instructions for AT&T 304, in one embodiment, includes the credit card information associated with the payment account 306 (Visa 1111), the charge date 310 (Nov. 4, 2007), the charge amount 312 ($123.00), the Payee's merchant ID and the Payee's designated processing platform (e.g., Acquirer Processor or Acquirer Gateway). The payment instructions are not limited to this specific information and may include any other information that may help in tracking or processing the payment instructions.

The Payer does not need to know the Payee's merchant ID or processing platform. In one embodiment, the Payer selects the Payee's name from a Payee list. In an alternative embodiment, the Payer identifies each Payee by a unique Payee identification number generated by the PDH 102. For example, the PDH may generate a unique Payee ID when the Payee is registered with the PDH. By way of example only, the PDH 102 generates the Payee ID based on the Payee's merchant ID.

In step 606, the PDH 102, after generating the payment instructions (Step 604), determines if the credit card number designated in the new payment instructions has any uncleared non-success conditions. In one embodiment, a non-success condition may comprise a decline associated with the credit card number. In an alternative embodiment, a non-success condition may comprise a prior failure associated with the credit card number. If the PDH 102 determines in step 606 that the credit card number does have a non-success condition associated with it, the PDH 102 will proceed to step 607 (to be discussed in more detail later). In step 607, the PDH 102 determines if a Decline Suspend setting has been enabled by the Payer (e.g., which the Payer has set in a user profile screen). If the Payer has enabled the Decline Suspend setting, the PDH 102 proceeds to step 608. In step 608, the PDH 102 suspends submission of the payment instructions. If, however, the Payer did not enable the Decline Suspend setting, the PDH 102 does not suspend the payment instructions and proceeds to step 610.

The PDH 102 will also proceed to step 610 if the PDH 102, in step 606, determines that the credit card information does not have a non-success associated with it. In step 610, the PDH 102 determines if the new payment instructions are scheduled for submission to the Acquirer Gateway 108 on the current day. In one embodiment, the submission day is equivalent to the charge date discussed above. For example, the payment instructions for AT&T 304 are scheduled to be submitted to the Acquirer Gateway 108 on Nov. 4, 2007. Suppose the payment instructions for AT&T 304 were generated on Nov. 1, 2007. In step 610, the PDH 102 will determine that the new payment instructions are not scheduled to be submitted to the Acquirer Processor 108 on the current day (Nov. 1, 2007). Thus, the PDH 102 places the new payment instructions for AT&T 304 in a pending payment queue, in step 612. When it is Nov. 4, 2007 (e.g., 12:01 am on Nov. 4, 2007), the PDH 102 continues to step 614.

The PDH 102, before submitting the payment instructions for AT&T 304 to the Acquirer Gateway 108, determines whether there are any other pending payment instructions with the same credit card number for a smaller charge amount, in step 614. For example, the PDH 102, before it submits the payment instructions for AT&T 304 to the Acquirer Gateway 108, determines if there are any pending payment instructions with the same credit card, Visa 1111, for less than $123.00. If the payment instructions for AT&T 304 comprises the smallest charge amount associated with Visa 1111 on Nov. 4, 2007, then the PDH 102 will submit the payment instructions for AT&T 304 to the Acquirer Gateway 108, in step 616.

In step 622, the PDH 102 waits for an authorization response from the Acquirer Gateway 108 in response to the just submitted payment instructions for AT&T 304. As previously discussed above, the authorization response has three conditions: authorized, declined and failed. A decline condition is a violation of a very specific card parameter and failure has little to do with the card. A failure condition is usually a processing failure of the network anywhere between the Acquirer Gateway and the issuing processor (or back again). Failure conditions can also be due to invalid data or incorrectly formatted data being passed by one party to the next party. If the PDH 102, in step 622, receives an authorized response from the Acquirer Gateway 108, the PDH 102 continues to step 626. If the PDH 102 receives either a declined response or a failure response from the Acquirer Gateway 108 in step 622, the PDH 102 continues to step 624.

The PDH 102 submits payment instructions including the same credit card number serially to the Acquirer Gateway 108. For example, the PDH 102 will wait for an authorization response from the Acquirer Gateway 108 in response to payment instructions for AT&T 304 (payment N) until the PDH 102 submits the next payment instructions (payment N+1) to the Acquirer Gateway 108 with the same credit card ("Visa 1111). Thus, in step 614, the PDH 102 determines that there are other pending payment instructions (payments N+1, N+2, N+3 . . . ) designating the same credit card (Visa 1111) and are for the same Submit On date (Nov. 4, 2007), the PDH 102 proceeds to step 618. In step 618, the PDH 102 suspends the submission of the payment instructions for AT&T 304 to the Acquirer Gateway 108. The payment instructions for AT&T 304 will remain suspended until the PDH 102 determines, in step 620, that there are no other payment instructions designating Visa 1111 scheduled to be submitted to the Acquirer Gateway 108 on Nov. 4, 2007 for an amount less than the amount of the payment to AT&T 304 ($123.00). When the PDH 102 determines that the payment instructions for AT&T 304 include the smallest amount associated with Visa 1111 to be submitted to the Acquirer Gateway 108 on Nov. 4, 2007 (step 620), the PDH 102 will submit the payment instructions for AT&T 304 to the Acquirer Gateway 108, in step 616.

The process of submitting payment instructions associated with the same credit card number to the Acquirer Gateway 108 in ascending order of charge amount provides several advantages. For example, submitting payment instructions with the same credit card number serially to the Acquirer Gateway 108 in order from the smallest charge amount to the largest charge amount provides the opportunity for the issuer processor to authorize a maximum number of payment instructions until the Payer, by way of example only, exceeds the credit limit associated with his issued commercial credit card.

Each credit card transaction generates interchange fees. Thus, the number of payment instructions authorized by the issuer processor directly affects the revenue for the issuing banks and the Payer. Submitting payment instructions designating a common credit card number to the Acquirer Gateway 108, one at a time, in order from the smallest payment to the largest payment, allows the PDH 102 to maximize the amount of interchange fees an issuing bank collects and maximizes the revenue share (percentage of interchange fee paid to Payer by issuing bank) collected by the Payer in a processing period. The issuing bank or merchant may also avoid unnecessary processing fees associated with the submission of payment requests on a card that has previously been declined for velocity violations (number of transactions allowed per cycle) or credit limit. This revenue is maximized while allowing as many Payees to be paid as possible. The payment instructions may, of course, be submitted to the Acquirer Gateway 108 in any order.

In step 622, the PDH 102 waits for an authorized notification from the Acquirer Gateway 108 in response to the just submitted payment instructions for AT&T 304. If the PDH 102, in step 622, receives an authorized notification from the Acquirer Gateway 108, the PDH 102 continues to step 626. If the PDH 102 receives a non-success condition from the Acquirer Gateway 108 in step 622, the PDH 102 continues to step 624.

In general, a credit card is either authorized or not authorized. Payment instructions generated by the PDH 102 include routing instructions indicating which Acquirer Gateway (or Acquirer Processor) to route the payment instructions to. There are many different Acquirer Gateways available in the credit card industry. If the Acquirer Gateway receives a successful authorization response in step 622 from the issuer processor, the Acquirer Gateway generates a successful reply code or value and passes this code to the PDH 102. Thus, the PDH 102 identifies that the payment instructions were authorized by interpreting the reply code received from the Acquirer Gateway 108. The same is true for payment instructions that are not authorized. These reply codes generated by the Acquirer Gateway are often unique to each Acquirer Gateway. In an alternative embodiment, the Acquirer Gateway may not pass an equivalent reply code to the Acquirer Gateway (or directly to the PDH), but may instead pass on an equivalent decline in accordance with a reason code shown in FIG. 7.

The Acquirer Gateway passes reason codes 704, or reply values 706 based on the reason codes 704, to the PDH 102. FIG. 7 illustrates an exemplary logic table of codes an Acquirer Gateway (or Acquirer Processor) may be exposed to. In the logic table shown in FIG. 7, the Acquirer Gateway generates the reply values 706 and receives the reason codes 704 from an issuer processor. The Acquirer Gateway 108 passes a reply value 706 of 1 to indicate to the PDH 102 that the payment instructions were authorized. The Acquirer Gateway 108 passes a reply value of 0 or −1 to indicate to the PDH that the payment instructions were not authorized. There are many reasons why the payment instructions for AT&T 304 may not have been authorized. The non-success conditions may comprise a failure due to, for example, data deficiencies or improper system behavior, or card declines which were issued by an issuer processor.

The logic table includes Reason Groups 702, Interchange Reason Codes 704 and Reply Values 706. The Reason Groups 702 are divided into Decline Codes 710, Failure Codes 712 and Successful Authorizations 713. The Reason Codes 704 are generated by an issuer processor. The Failure Codes 712, in this embodiment, are divided into Invalid Data Codes 714, Recoverable Failures 716 and Unrecoverable Failures 718. The Reply Values 706 are generated by the Acquirer Gateway, and are divided into three values: 0, −1 and 1.

FIG. 7 illustrates that the Acquirer Gateway generates a reply value 706 of 0 when it receives a decline code 710 from the issuer processor. The Acquirer Gateway 108 generates a −1 reply value 706 when it receives either an invalid data code 714, a recoverable failure code 716 or an unrecoverable failure code 718 from the issuer processor. For example, the Acquirer Gateway 108 generates a 0 reply value 706 if it receives a credit limit code 210 from the issuer processor. The Acquirer Gateway generates a −1 reply value 706 if it receives a merchant configure error code 234, a card not accepted code 232, and so on from the issuer processor. If the Acquirer Gateway 108 passes a 0 Reply Value 706 to the PDH 102, the PDH 102 interprets the Reply Value as the payments instructions were not authorized based on a Decline Code 710. If the Acquirer Gateway 108 passes a −1 Reply Value 706 to the PDH 102, the PDH 102 interprets the Reply Value as the payment instructions were not authorized based on one of the Failure Codes 712. If the Acquirer Gateway 108 passes a 1

Reply Value 706 to the PDH 102, the PDH 102 interprets that the payment instructions were authorized.

Figure 8A:
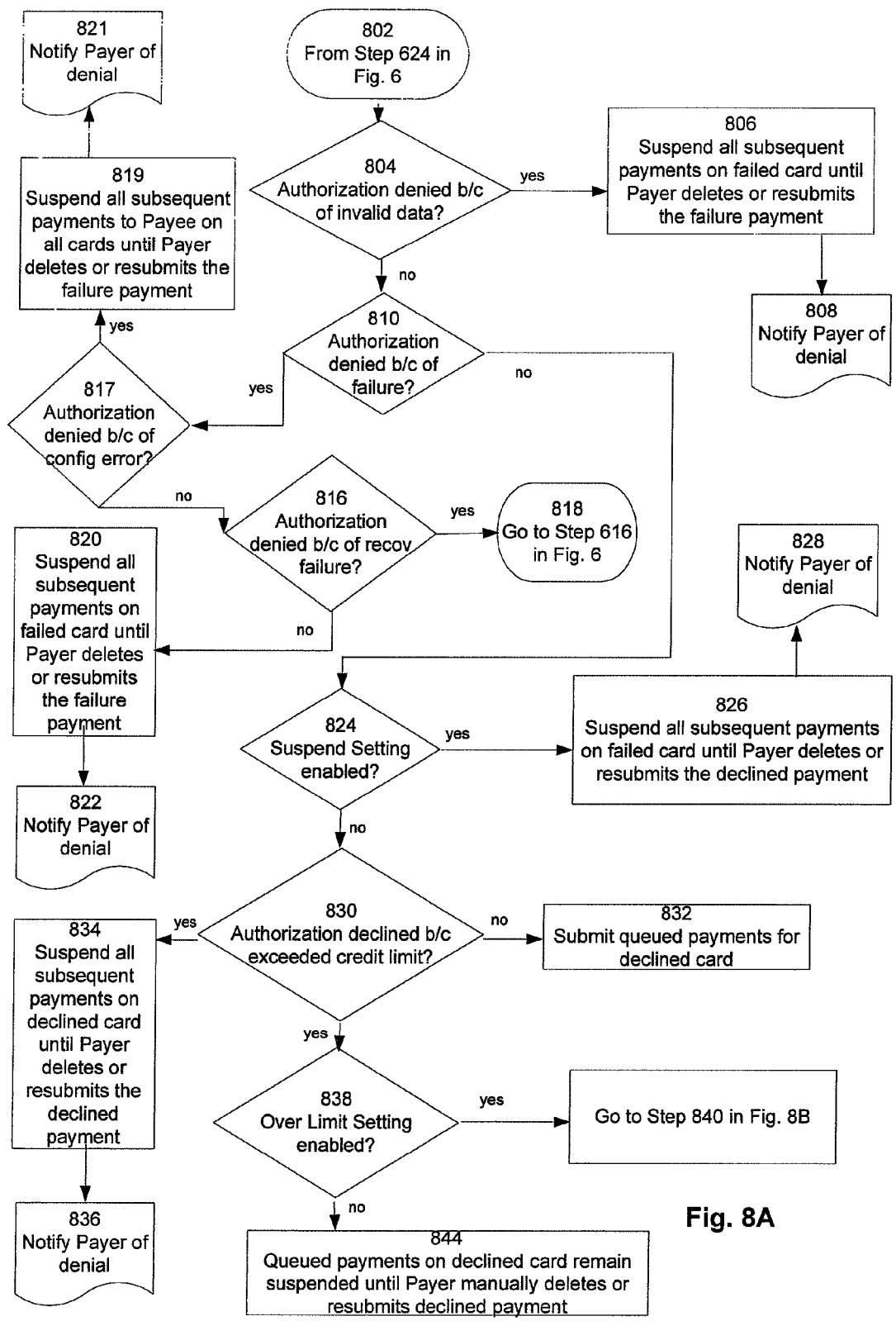
FIGS. 8A-8B depict a flow diagram displaying exemplary steps of a payment methodology of the Payer Direct Hub.
Figure 8B:
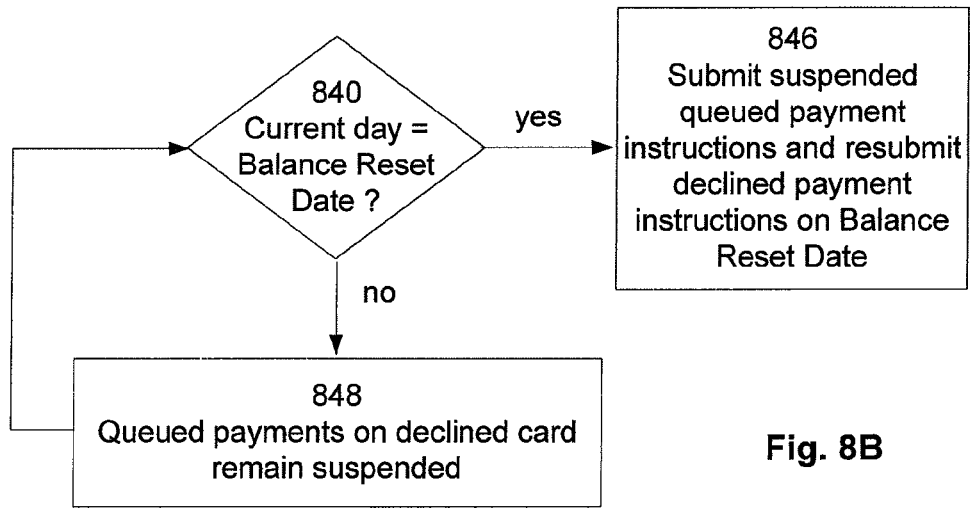

FIGS. 8A-8B illustrates a flow diagram depicting exemplary interrogation steps performed by the PDH 102 in response to receiving a non-success response from the Acquirer Gateway 108. As discussed above, the PDH 102 will receive a 0 or −1 Reply Value 706 from the Acquirer Gateway in this situation (if the Acquirer Processor 108 has this feature). FIG. 7 illustrates that not all −1 Reply Values 706 are equal. Thus, the PDH 102 will interrogate the Reply Value 706 further to determine the specific Reason Code 704. For example, if the issuer processor denied authorization of the payment instructions for AT&T 304 based on a recoverable failure 716, the PDH 102, once it has this information, automatically resubmits the payment instructions for AT&T 304 to the Acquirer Gateway 108. However, if the issuer processor denied the payment instructions for AT&T 304 due to an unrecoverable failure 718, the PDH 102, once it has this information, may suspend the payment instructions for AT&T 304. Consequently, by defining the more specific reason code 704, the PDH 102 provides additional processing.

The exemplary steps shown in FIGS. 8A-8B will be described in reference to processing the payment instructions for AT&T 304. In step 802, the PDH 102 has determined that the newly submitted payment instructions for AT&T 304 were not authorized (step 624 in FIG. 6). At this point, the PDH 102 begins an interrogation process to determine why the newly submitted payment instructions for AT&T 304 were not authorized by the issuer processor.

In step 804, the PDH 102 determines if the payment instructions for AT&T 304 were not authorized because of an invalid data reason code 714. If the PDH, in step 804, determines that the payment instructions for AT&T 304 were not authorized because of an invalid data reason code, the PDH proceeds to step 806. In step 806, the PDH 102 suspends all subsequent payments associated with the credit card number included in the payment instructions for AT&T 304 until the Payer deletes or resubmits the not authorized payment instructions for AT&T 304. In one embodiment, the PDH 102, in step 808, notifies the Payer that payment instructions for AT&T 304 were not authorized. Notifying the Payer is not required. If the PDH 102, in step 804, determines that the payment instructions for AT&T 304 were not authorized because of an invalid reason code, the PDH 102 proceeds to step 810.

In step 810, the PDH 102 determines whether the payment instructions for AT&T 304 were not authorized because of one of the other failure codes 712 (invalid data has already been ruled out). If the PDH 102 determines that the payment instructions for AT&T 304 were not authorized because of a failure code in step 810, the PDH 102 then proceeds to first ask whether the payment instructions were denied because of an unrecoverable failure code 718, in step 817. The example of an unrecoverable failure code provided in FIG. 8 is a merchant configuration error. If the PDH 102 determines that the payment instructions for AT&T 304 were not authorized because of an unrecoverable failure, the PDH 102 proceeds, in step 819, to suspend all subsequent pending payment instructions associated with the Payee. In one embodiment, the PDH 102 further notifies the Payer that payment instructions for AT&T 304 were not authorized, in step 821. The Payer has the opportunity to manually correct the invalid data before submitting the payment instructions for AT&T 304 a second time.

If the PDH 102, in step 817, determines that the payment instructions for AT&T 304 were not authorized because of an unrecoverable error, the PDH 102 proceeds to step 816. In step 816, the PDH 102 determines whether payment instructions were denied because of a recoverable failure 716. If in step 816, the PDH 102 determines that the payment instructions were denied because of a recoverable failure, then the PDH 102, in step 818, proceeds to resubmit the payment instructions to the Acquirer Gateway 108 (step 616 in FIG. 6). If the PDH 102, in step 816, determines that the payment instructions for AT&T 304 were not authorized because of recoverable failure, the PDH 102 proceeds to step 820.

In step 820, the PDH 102 suspends all other pending payment instructions designating the same credit card number as the payment instructions for AT&T 304 (Visa 1111) until the Payer deletes or resubmits the payment instructions for AT&T 304. This prevents the Payer from receiving further decline notifications. In one embodiment, the PDH 102 further notifies the Payer of the denied payment instructions (step 822).

If the PDH 102, in step 810, determined that the payment instructions for AT&T 304 were not authorized because of any of the failure codes 712, the PDH 102 proceeds to step 824. At this point, the PDH 102 has eliminated the possibility that the non-success response is due to a failure code 712 (because the answer to step 810 was "no"). As discussed above, submitting payment instructions for AT&T 304 to the Acquirer Gateway 108 may result in three possible outcomes: authorization (success), failure (non-success and either recoverable failure or non-recoverable failure) or decline (non-success). By step 810, the PDH 102 has eliminated the possibility of an authorization or a failure. Thus, the PDH 102 determines that the payment instructions for AT&T 304 were not authorized because of a decline code 710. In step 824, the PDH 102 determines whether the Payer has enabled a suspend setting feature in the Payer's user profile screen (not shown). If the Payer has enabled the suspend setting feature, the PDH 102 proceeds to step 826. In step 826, the PDH 102 suspends all subsequent payment instructions designating the same credit card number as the payment instructions for AT&T 304 (Visa 1111) until the Payer deletes or resubmits the declined payment instructions for AT&T 304. In one embodiment, the PDH 102 further notifies the Payer of the declined payment instructions, in step 828. If, however, the PDH 102 determines that the Payer did not enable the suspend setting feature, the PDH 102 proceeds to step 830.

In step 830, the PDH 102 begins to interrogate which decline code 704 was issued by the issuer processor. For example, in step 830, the PDH 102 determines whether the payment instructions for AT&T 304 were declined because the Payer exceeded the credit limit of the commercial credit card. If the PDH 102 determines that the payment instructions for AT&T 304 were declined for reasons other than exceeded credit limit in step 830, the PDH 102, in step 832, continues to submit subsequent payment instructions with the same credit card number as the payment instructions for AT&T 304 (Visa 1111) to the Acquirer Gateway 108. If however, the PDH 102, in step 830, determines that the payment instructions for AT&T 304 were declined because the Payer exceeded the credit limit of the credit card, the PDH 102 proceeds to steps 834 and 838. In step 834, the PDH 102 suspends all pending payment instructions with the same credit card (e.g., Visa 1111) until the Payer deletes or resubmits the declined payment instructions for AT&T 304 to the Acquirer Gateway 108. In one embodiment, the PDH 102 further notifies the Payer of the declined payment instructions for AT&T 304, in step 836.

In step 838, the PDH 102 checks to see if the Payer enabled an Over Limit setting in the Payer's profile interface. The Over Limit setting, if enabled, causes the PDH to resubmit the declined payment instructions for AT&T 304 as well as submit the other suspended payment instructions with the same credit card number as the payment instructions for AT&T 304. If the Payer did not enable this feature, the PDH 102, in step 838, proceeds to step 844. In step 844, the PDH 102 maintains the suspension of the other suspended payment instructions (step 834) with the same credit card number as the payment instructions for AT&T 304 until the Payer either manually resubmits or deletes the declined payment instructions for AT&T 304.

If the Payer did enable the Over Limit feature, the PDH 102, in step 838, proceeds to step 840 in FIG. 8B. At this point in the processing, the payment instructions for AT&T 304 have been declined for exceeding the credit limit of the credit card Visa 1111. In the example provided above, the credit card designated as Visa 1111 is a commercial credit card. Commercial credit cards issued to employees within one company (e.g., Company A) typically have the same billing cycle. By contractual agreement between the issuing bank and the Company, the balance on all of the commercial credit cards issued to the Company is reset to the maximum limit on a Balance Reset date. The Balance reset date may include any number of days following the statement end date of the Company's commercial credit cards (including less than one day). The Over Limit setting enables the PDH 102 to resubmit the payment instructions for AT&T 304 to the Acquirer Gateway 108 when the statement end date for Visa 1111 has expired and the maximum card limit has been reset (on the Balance Reset date).

In step 840, the PDH 102 determines if the current day is the Balance Reset date associated with the commercial credit card (e.g., Visa 1111). The payment instructions for AT&T 304 were submitted to the Acquirer Gateway 108 on Nov. 4, 2007 and were declined by the issuer processor on the same day. Suppose the Balance Reset date associated with Visa 1111 is Nov. 6, 2007. In one embodiment, the PDH 102, at 12:01 am on Nov. 5, 2007, identifies the Balance Reset date associated with Visa 1111 and determines if the Balance Reset date matches the current day of Nov. 5, 2007. If the Balance Reset date associated with Visa 1111 is not Nov. 5, 2007, the PDH proceeds to step 848.

The PDH 102 repeats this cycle at 12:01 am on Nov. 6, 2007 (step 840), and determines that the Balance Reset date associated with Visa 1111 matches the current day (both Nov. 6, 2007), and proceed to step 846. In step 846, the PDH 102 resubmits the payment instructions for AT&T 304 to the Acquirer Gateway 108 and submits the suspended pending payment instructions with the same credit card number (Visa 1111) to the Acquirer Gateway 108 according to the steps shown in FIG. 6.

Figure 9:
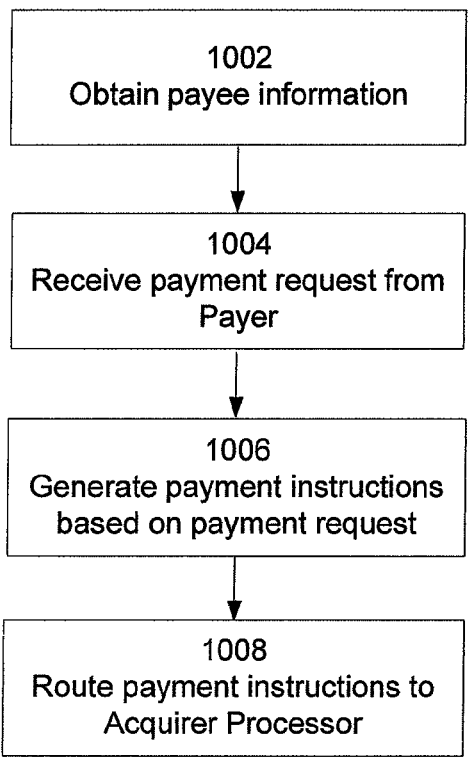
FIG. 9 depicts a flow diagram displaying exemplary steps performed by the Payer Direct Hub to route the payment instructions to an Acquirer Processor.

FIG. 9 illustrates exemplary steps performed by the PDH 102 to process each of the payment instructions. For discussion purposes only, the process is described herein for processing the payment instructions for AT&T 304 as a single credit card transaction. The PDH 102 processes other payment instructions in a similar fashion. In step 1002, the PDH 102 obtains the payee information required to process the payment instructions for AT&T 304 as a credit card transaction, which includes a merchant identification and processing platform information associated with AT&T 304. In step 1004, the PDH 102 receives a payment request from the Payer. As discussed above, each payment request submitted by the Payer designates the Payee, a charge date, a charge amount and credit card information such as a credit card number to charge the charge amount against. In an alternative embodiment, the PDH 102 receives a payment request from the Payer prior to obtaining the Payee information.

In step 1006, the PDH 102 generates payment instructions for AT&T 304 based on the payment request submitted by the Payer. The payment instructions for AT&T 304 include the information required to process the payment instructions as a single credit card transaction. In one embodiment, the payment instructions include the information submitted by the Payer (e.g., charge amount, charge date, credit card information) combined with the merchant identification and processing platform information associated with the Payee.

In step 1008, the PDH 102 routes the payment instructions for AT&T 304 to an Acquirer Gateway or Acquirer Processor. The PDH 102 routes the payment instructions for AT&T 304 to the Acquirer Processor (or Acquirer Gateway) designated in the processing platform information contained in the payment instructions. The payment instructions are processed as a single credit card transaction.

Figure 10:
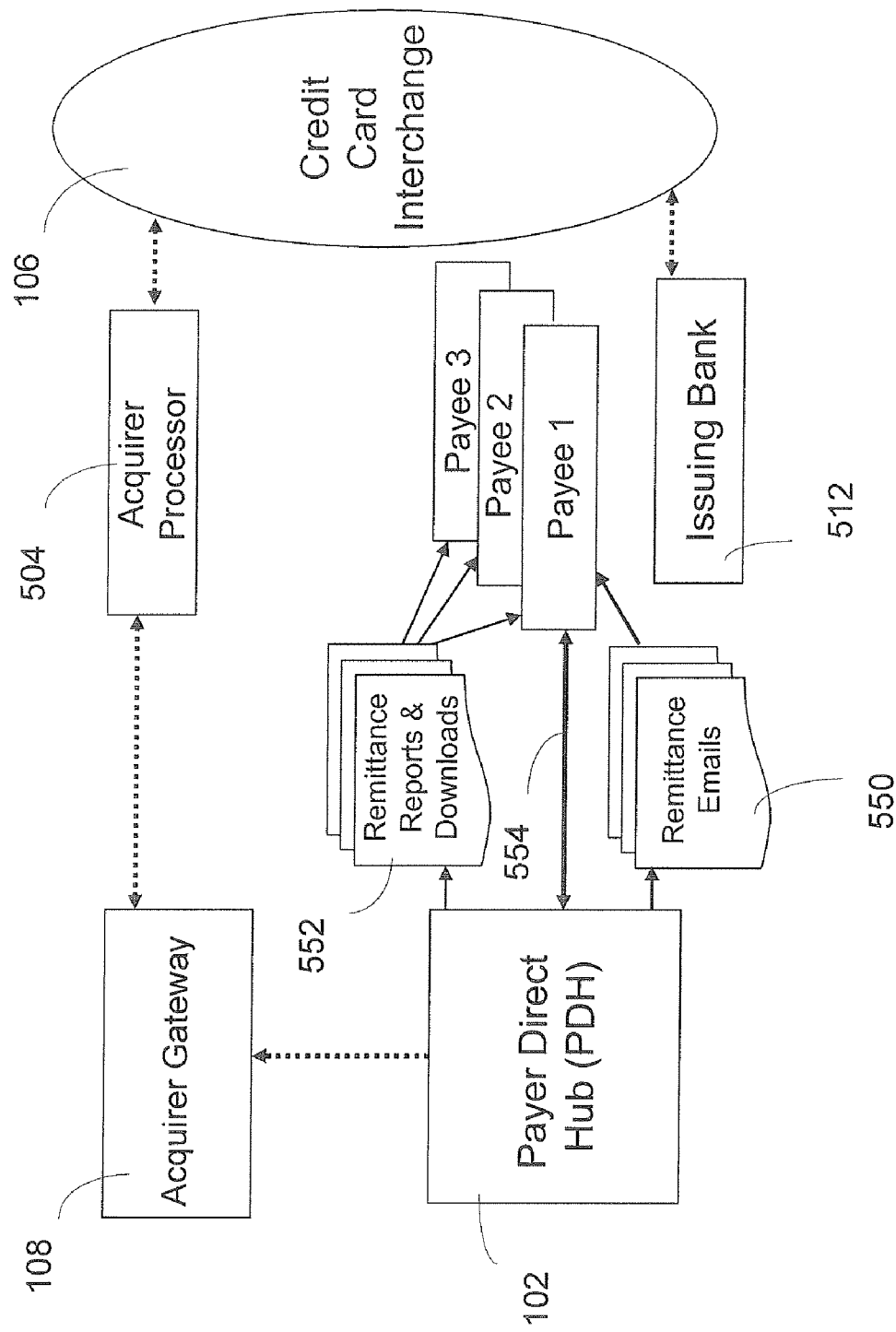
FIG. 10 depicts a schematic diagram illustrating an exemplary Payer Direct Hub Payee reporting component.

FIG. 10 illustrates a Payee reporting feature of the PDH 102. The PDH 102 may generate, by way of example only, reports 552, email notifications 550 and downloadable files for the Payee. Reports 552, by way of example only, may include reports showing invoice payments grouped by Payer and general spend reports grouped by Payer (purchases without invoices). An email notification 550 may include emails sent to the Payee after the PDH 102 receives a successful authorization from the Acquirer Gateway or Acquirer Processor (e.g., email notifying the Payee of an impending payment and invoice reference and Payer reference). A downloadable file, by way of example only, may include an Excel spreadsheet or text (e.g., ASCII) associated with remittances with invoice and Payer references.

The PDH 102 may also include a feature whereby the Payee may access the PDH 102 to view the pending payments queues displaying approved payment instructions with invoice reference (access to the PDH 102 shown as link 554). Link 554 may also allow the Payee access to consolidated Payer records of 'authorized' payments to Payee (e.g., payment instructions that have not reached a settlement status yet). Link 554 may also allow the Payee to view the consolidated records that are settled (e.g., consolidated authorization intended for Payee). In a conventional card processing system, banks get settlement feeds from card associations such as VISA and MASTERCARD, and make these consolidated settlement records available to Payers. However, these banks generally do not make the settlement feeds available to the Payees. Unlike the conventional card processing system, link 554 allows a Payee to view consolidated 'authorized' payments. In one embodiment, the Payee is registered by a Payer and has been granted permission to view the Payer's authorization queue. In one example, the Payer sets up the Payee in the PDH (e.g., the Payee is identified in the PDH by its Company ID). To control access to the Payer's authorization queue, one Payee employee is enrolled with the PDH. This enrolled Payee employee may login and access reports, screens, the Payer queue after the Payer has granted the Payee permission to do so.

The PDH 102 may also be used in an Electronic Invoice Presentment & Payment (EIPP) market. For example, in an EIPP market, PDH may supply an electronic form (e.g., invoice form) whereby the Payee (one who is enrolled and one who has been granted viewing rights by a Payer), completes the invoice form and routes the invoice form to the Payer. The electronic invoice form would appear in a Payer Invoice queue (not shown). In one embodiment, the Payer Invoice queue may appear similar to the Make Payment screen discussed above, except the invoice data would be pre-populated in the screen. To make the payment, the Payer would, by way of example only, assign a credit card number (as the Payer currently does in the Make Payment screen) and click the Make Payment button. The transaction would then be processed by the PDH 102 as previously described above (e.g., similar to a payment request).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method for processing payment requests submitted by a payer through a single user interface of a payment system, wherein the payment requests are for monies owed by the payer to multiple payees, comprising:
   registering payees with the payment system, wherein registering includes obtaining a merchant identification and an acquirer processor identification associated with each registered payee;
   providing a user interface that allows a payer to schedule a payment request to pay one or more payees for monies owed by the payer, wherein a payment request designates a registered payee and an amount to charge the payer's credit card on a charge date to pay for a purchase previously made by the payer that has not yet been settled;
   receiving a plurality of payment requests from the payer, wherein each payment request designates a payee, a credit card, a charge date, and a charge amount;
   generating payment instructions based on each scheduled payment request, wherein each of the scheduled payment instructions is generated by an application server and designates the payer's credit card, the charge date, the charge amount, and the merchant identification and acquirer processor identification associated with the registered payee in a format that may be processed as a credit card transaction;
   storing the generated payments instructions in a database, wherein the generated payment instructions are organized in the database by credit card in order of the charge amount;
   on a charge date, routing the generated payment instructions associated with the same credit card and charge date from the database to the acquirer processor designated in the payment instructions in order of charge amount without any involvement from the payee to be processed as a credit card transaction;
   receiving an authorization notification from the acquirer processor associated with the routed generated payment instructions;
   when the authorization notification is an unsuccessful authorization notification associated with a decline value, suspending routing of the remaining generated payment instructions designating the same credit card as the declined payment instructions to the acquirer processor; and,
   when the authorization notification is an unsuccessful authorization notification associated with a failure value, resubmitting the declined payment instructions to the acquirer processor for authorization when the failure value is associated with a recoverable failure;
   suspending routing of the remaining generated remaining payment instructions including the same payee as the failed payment instructions to the acquirer processor when the failure value is associated with an unrecoverable failure.

2. The method as recited in claim 1, further including when the authorization notification received from the acquirer processor comprises a non-successful notification, suspending routing of other payment instructions to the acquirer processor that include the same credit card.

3. The method as recited in claim 1, wherein the step of routing the generated payment instructions comprises routing the generated payment instructions from the database to the acquirer processor in order from the smallest charge amount to the largest charge amount.

4. The method as recited in claim 1, wherein the step of routing further comprises:
   routing first payment instructions to the acquirer processor; and
   routing second payment instructions with the same credit card information as the first payment instructions to the acquirer processor only after the acquirer processor receives a final authorization associated with the first payment instructions.

5. The method as recited in claim 1, wherein receiving payment requests from the payer comprises receiving a batch file uploaded from the payer containing each of the payment requests.

6. The method recited in claim 1, wherein the acquirer processor comprises an acquirer gateway.

7. A method performed by a payment system for managing authorization of credit card payments for monies owed by a payer to a plurality of payees, comprising:
   registering payees with the payment system, wherein a merchant identification and an acquirer processor associated with a payee is obtained via a registration process generated by an interface server;
   providing a user interface that allows a payer to schedule a payment request to a plurality of payees;
   receiving a payment request from the payer to pay monies owed by the payer to a payee, wherein the payment request is to pay for a purchase previously made by the payer that has not yet been settled, the payment request and includes a credit card number, a charge amount and a charge date;
   generating payment instructions based on the new payment request received from the payer, wherein the payment instructions are generated by an application server and include the credit card number, charge amount and charge date from the received payment request and the merchant identification and acquirer processor associated with the registered payee so that an acquirer processor may process the payment instructions as a single credit card transaction;
   storing the generated payment instructions in a database;
   identifying other payment instructions stored in the database including the same credit card number and the same charge date as the generated payment instructions but for a smaller charge amount than the charge amount associated with the generated payment instructions;
   when none of the other payment instructions with the credit card number for the same charge date are for a smaller charge amount than the charge amount associated with the payment instructions, submitting the generated payment instructions to an acquirer processor to process the generated payment instructions as a single credit card transaction without any involvement of the payee, wherein the generated payment instructions are submitted to the acquirer processor by the application server;
   when there are other payment instructions with the same credit card number for the same charge date for a smaller charge amount than the charge amount associated with the generated payment instructions, suspending submission of the generated payment instructions to the acquirer processor until the acquirer processor receives a final authorization related to each of the other payment instructions with the same credit card number and the same charge date but for smaller charge amounts, wherein the other payment instructions with the same credit card number and the same charge date are submitted to the acquirer processor in order from the smallest charge amount to the largest charge amount, wherein the payee is not involved in the authorization of any of the other payment instructions with the same credit card number and charge date but for smaller charge amounts;

receiving an authorization notification from the acquirer processor associated with the routed generated payment instructions;

when the authorization notification is an unsuccessful authorization notification associated with a decline value, suspending submission of the remaining generated payment instructions designating the same credit card number as the declined payment instructions to the acquirer processor; and when the authorization notification is an unsuccessful authorization notification associated with a failure value, resubmitting the declined payment instructions to the acquirer processor for authorization when the failure value is associated with a recoverable failure;

suspending submission of the remaining generated remaining payment instructions including the same payee as the failed payment instructions to the acquirer processor when the failure value is associated with an unrecoverable failure.

8. The method as recited in claim 7, wherein receiving a new payment request from the payer comprises receiving a payee identification, a charge amount, a charge date and credit card information from the payer through a user interface.

9. The method as recited in claim 8, wherein generating new payment instructions based on the new payment request received from the payer comprises:

identifying a merchant identification associated with the payee identification;

identifying an acquirer processor identification associated with the payee identification;

obtaining the credit card number, charge amount and charge date from the new payment request; and generating payment instructions that include the charge amount, the charge date, the credit card number and the merchant identification and acquirer processor identification associated with the payee identification.

10. The method as recited in claim 7, wherein suspending submission of the new payment instructions to the acquirer processor comprises:

placing the new payment instructions into a pending payments queue, wherein the pending payments queue includes the new payment instructions and the other payment instructions associated with the same credit card information; and organizing the new payment instructions and the other payment instructions associated with the same credit card information within the pending payments queue in order of charge amount.

11. The method as recited in claim 7, wherein the acquirer processor comprises an acquirer gateway.

12. A method for managing authorization of credit card payments scheduled by a payer through a single user interface for monies owed by the payer to a plurality of payees, comprising:

generating a plurality of payment instructions, wherein each of the plurality of payment instructions is generated by an application server and is based on data electronically submitted by a payer via a user interface to pay for monies owed to a payee for a purchase previously made by the payer that has not yet been settled;

storing the plurality of payment instructions in a pending payments queue located in a database;

retrieving one of the plurality of payment instructions from the database, wherein the payment instructions associated with the same credit card are retrieved by the application server from the database in order of smallest charge amount to largest charge amount;

submitting the retrieved payment instructions to an acquirer processor so that the payment instructions are processed as a single credit card transaction, wherein the payment instructions are submitted by the application server to the acquirer processor for authorization and settlement and are not submitted by the payee designated in the payment instructions;

receiving an unsuccessful authorization notification from the acquirer processor and designating the submitted payment instructions as declined payment instructions;

determining whether the unsuccessful authorization notification received from the acquirer processor is associated with a decline value or a failure value;

when the unsuccessful authorization notification is associated with a decline value, suspending submission of each of the remaining plurality of payment instructions designating the same credit card as the declined payment instructions to the acquirer processor; and, when the unsuccessful authorization notification received from the acquirer processor is associated with a failure value, resubmitting the denied payment instructions to the acquirer processor for authorization when the failure value comprises a recoverable failure;

suspending submission of the remaining plurality of payment instructions including the same payee as the failed payment instructions to the acquirer processor when the failure value is associated with an unrecoverable failure.

13. The method as recited in claim 12, wherein when the unsuccessful authorization notification is associated with a decline value, further comprising:

identifying the balance reset date of the credit card designated in the declined payment instructions;

resubmitting the declined payment instructions to the acquirer processor after the balance reset date.

14. The method as recited in claim 12, further comprising notifying the payer of the declined payment instructions.

15. The method as recited in claim 12, wherein the plurality of suspended payment instructions are not submitted to the acquirer processor until the payer deletes the declined payment instructions.

16. The method as recited in claim 12, wherein generating each of the plurality of payment instructions comprises:

obtaining a credit card number, payee identification, a charge date and a charge amount designated by the payer;

obtaining a merchant identification and an acquirer processor identification associated with the payee;

generating payment instructions including the credit card number, payee identification, the charge date, the charge amount, the merchant identification and the acquirer processor identification.

17. The method as recited in claim 12, wherein the acquirer processor comprises an acquirer gateway.

18. One or more processor readable storage devices having processor readable code embodied on said processor readable storage devices, said processor readable code for programming one or more processors for managing multiple credit card payments for monies owed by the payer to multiple payees, comprising:

an interface engine configured to provide a user interface for:

a payee to register with a bill payment system and provide a merchant identification and an acquirer processor identification associated with the payee;

a payer to schedule payment requests to one or more registered payees, wherein each payment request designates a registered payee, a credit card number, a charge date and a charge amount;

an application engine configured to generate payment instructions based on each of the scheduled payment requests, route each of the payment instructions to the acquirer processor designated in the payment instructions, in order of charge amount, to be processed as a credit card transaction, and receive an authorization notification from the acquirer processor, each without any involvement of the payee designated in the payment instructions; and, a database engine configured to store each of the payment instructions in a payment queue when the charge date designated in the payment instructions does not indicate that the payment instructions should be routed to the acquirer processor;

wherein when the authorization notification is an unsuccessful authorization notification associated with a decline value, the application engine suspends the routing of the remaining generated payment instructions in the payment queue designating the same credit card number as the declined payment instructions to the acquirer processor;

wherein when the authorization notification is an unsuccessful authorization notification associated with a failure value, the application engine resubmits the declined payment instructions to the acquirer processor for authorization when the failure value is associated with a recoverable failure;

the application engine suspends submission of the generated remaining payment instructions in the payment queue including the same payee as the failed payment instructions to the acquirer processor when the failure value is associated with an unrecoverable failure.

19. The one or more processor readable storage devices as recited in claim 18, wherein the acquirer processor comprises an acquirer gateway.

20. The one or more processor readable storage devices as recited in claim 18, further comprising a notification engine configured to notify the payer when the authorization received from the acquirer processor comprises an unsuccessful authorization notification.

21. The one or more processor readable storage devices as recited in claim 18, wherein the interface engine is further configured to allow the payer to access a declined payments interface to edit and delete payment instructions that were not successfully authorized by the acquirer processor.

22. The one or more processor readable storage devices as recited in claim 18, wherein the application engine is further configured to resubmit payment instructions associated with a decline value to the acquirer processor after a balance reset date associated with the credit card included in the payment instructions.

* * * * *